United States Patent [19]

Crabb

[11] 4,024,936
[45] May 24, 1977

[54] COMBINATION VEHICLE SERVICE AND PARKING BRAKE

[75] Inventor: Elmer R. Crabb, Pekin, Ill.

[73] Assignee: Caterpillar Tractor Co., Peoria, Ill.

[22] Filed: Oct. 28, 1975

[21] Appl. No.: 626,424

[52] U.S. Cl. .............................. 192/4 A; 188/170; 192/86; 192/91 A
[51] Int. Cl.² ........................................ F16D 65/16
[58] Field of Search ............ 188/170, 366; 192/86, 192/91 A, 4 A, 4 C

[56] References Cited

UNITED STATES PATENTS

| | | | |
|---|---|---|---|
| 3,132,724 | 5/1964 | Ansteth | 188/170 X |
| 3,212,357 | 10/1965 | Knowles et al. | 192/4 A |
| 3,680,666 | 8/1972 | Sommer | 188/170 |
| 3,893,549 | 7/1975 | Bennett | 188/170 |
| 3,893,556 | 7/1975 | Lech et al. | 192/91 A |
| 3,927,737 | 12/1975 | Prillinger et al. | 192/91 A |
| 3,946,837 | 3/1976 | Houser | 192/91 A |

Primary Examiner—Benjamin W. Wyche
Attorney, Agent, or Firm—Phillips, Moore, Weissenberger, Lempio & Majestic

[57] ABSTRACT

A vehicle service and parking brake of the multiple oil disc configuration is included in the transmission housing of the vehicle. A plurality of interleaved braking discs arranged circumferentially about the output shaft of the transmission with one disc associated with the output shaft while the next adjacent disc is associated with the transmission housing forms the braking element. Brake applicator, movable in a first direction to cause the interleaved braking discs to come together in braking relation one with another and movable in a second direction to allow the braking discs to separate, is urged in the first direction by resilient means. The brakes are released by pneumatic means urging the brake applicator in the second opposite direction. Pneumatic service brake actuator is provided and is selectively operable to act in cooperation with the resilient means to urge the brake applicator in the first direction to apply the vehicle service brakes. Mechanical means are also provided to disengage the braking discs while no air pressure is available in the vehicle.

10 Claims, 2 Drawing Figures

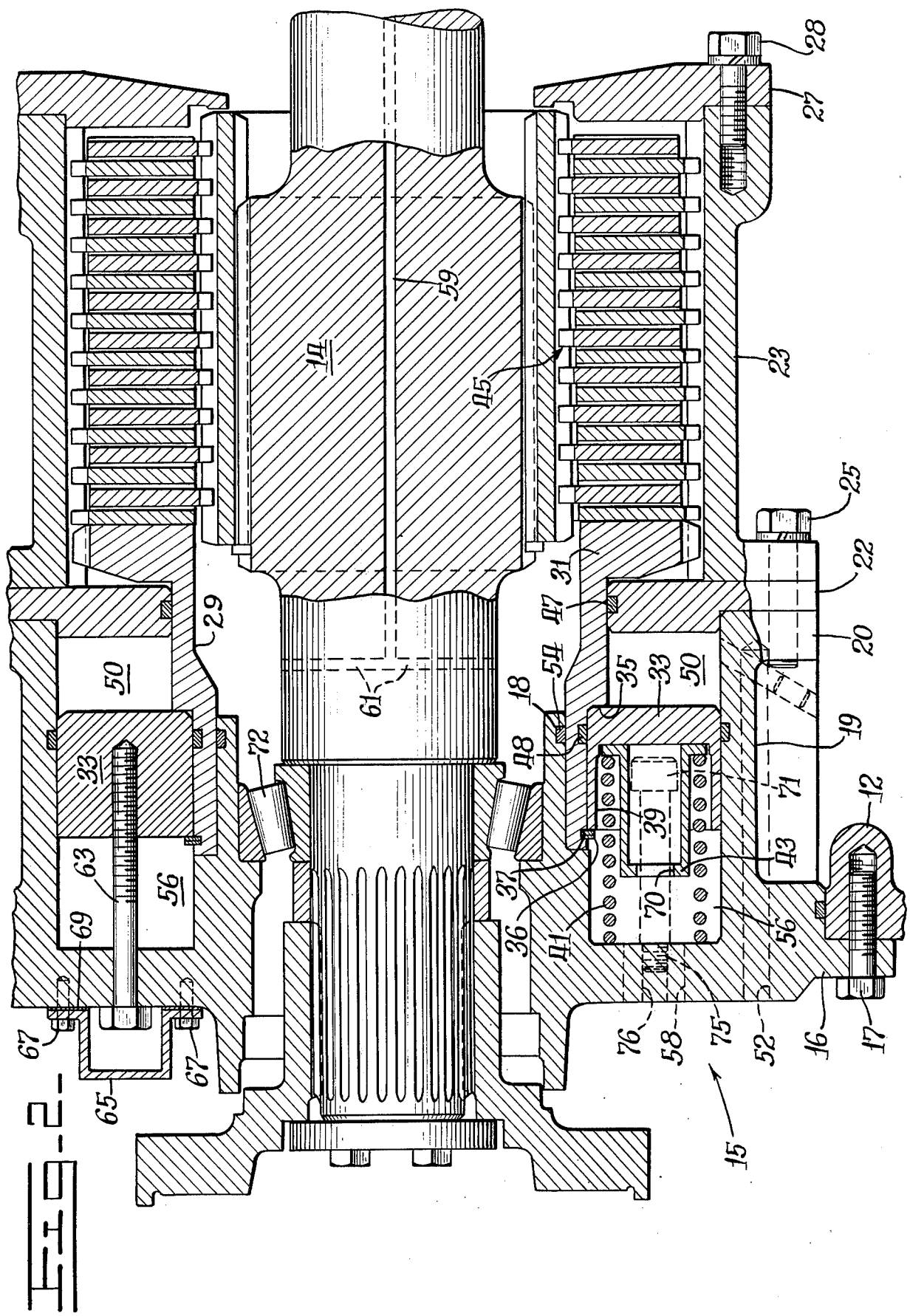

COMBINATION VEHICLE SERVICE AND PARKING BRAKE

BACKGROUND OF THE INVENTION

The invention relates to a service and parking brake assembly for vehicles. More particularly the invention is directed toward wheeled tractor type vehicles having a transmission driven by an engine, the transmission in turn driving the vehicle wheels, with the service and parking brake herein disclosed incorporated in the tranmission housing.

Although vehicle parking brakes have for a number of years utilized a braking element on the drive shaft of the vehicle, the vehicle service brakes are normally associated wit each driving wheel. Pneumatic, hydraulic and mechanical brake systems have been commonly used for service brake applications while the vehicle parking brake is normally of the mechanical type. In some cases the parking brake and the service brake and the service brakes have been consolidated, utilizing the same braking elements with different actuation means. Multiple dic brakes of the type utilized in heavy equipment generally require a cooling system to dissipate heat generated in the brake discs during actuation of the brakes. When such brakes are located in the wheel elements or in the vicinity of the wheel elements this cooling system requires extensive plumbing to communicate the cooling fluid to the brakes and return the cooling fluid to a heat exchanger for heat dissipation. Additionally, a fluid pump is needed to communicate the fluid to the various brake elements.

Placing the brake elements at the vehicle wheels requires a minimum of two brake assemblies although four brake assemblies are generally used on four wheeled vehicles with the possibility of additional brake assemblies in multi-wheeled vehicles.

It is apparent that to consolidate the braking requirements of a vehicle in a single brake assembly would be most desirable from the economic standpoint in that only a single brake assembly is necessary. Furthermore, the requirement for complex hydraulic systems or pneumatic systems to apply the brakes and to disengage the brakes may be considerably simplified. Additionally, the problem of providing cooling fluid to multiple disc brakes, mentioned above, may also be simplified. Further, to design a brake which is normally engaged, and is disengaged only while supplied with air pressure from the vehicle pneumatic system, provides the additonal feature of a "fail-safe" system. That is, failure of the vehicle engine and the associated pneumatic system while the vehicle is underway automatically applies the brakes thereby bringing the vehicle to a stop and maintaining the vehicle in a stopped condition until the failed system can be repaired. These objects may be achieved by associating the service brakes and the parking brakes with the main drive shaft and utilizing the vehicle pneumatic system to disengage the braking elements associated with the aforesaid drive shaft.

SUMMARY OF THE INVENTION

Accordingly, this invention is a vehicle service and parking brake associated with the output shaft of the vehicle transmission and positioned in the transmission housing. The service and parking brake comprises a plurality of interleaved discs in a support cylinder surrounding the output shaft and associated with the housing, alternate discs are slidably connected with the output shaft to rotate therewith while intervening discs are slidably associated with the support cylinder. Brake applicator means movable in a first direction are provided for urging the discs one against the other to inhibit rotation of the output shaft and movable in a second direction to permit the discs to separate and allow the output shaft to freely rotate. Resilient means are included to urge the brake applicator means in the first direction. Release means are also included to act against the resilient means to urge the brake applicator means in the second direction. Selectively operable actuator means are also provided to act in cooperation with the resilient means to overcome the release means.

It is an object of this invention to provide a vehicle service and parking brake which is incorporated in the transmission housing of the vehicle and associated with the output shaft of the transmission.

It is also an object of this invention to provide a vehicle braking system which combines a service brake for use while operating the vehicle with a parking brake for use while the vehicle is at rest.

It is a further object of this invention to provide a braking system incorporated in the transmission housing which is engaged by resilient means and disengaged by pneumatic means.

It is a still further object of this invention to provide a braking system incorporated in the transmission housing which includes pneumatic means to augment the resilient means while the vehicle service brakes are applied.

It is still another object of this invention to provide a braking system incorporated in the transmission housing which utilizes lubricating fluid normally circulated in the transmission as a coolant for the braking elements.

It is still another object of this invention to provide a vehicle brake system which may be disengaged by mechanical means.

It is also an object of this invention to provide a vehicle braking system which is easily manufactured and assembled.

These objects and other objects will be readily apparent after study of the following descriptions and appended drawings.

BRIEF DESCRIPTION OF THE DRAWINGS

FIG. 2 is a detailed view in cross-section of the braking system shown in FIG. 1.

DETAILED DESCRIPTION OF THE DRAWINGS

Figure 1:
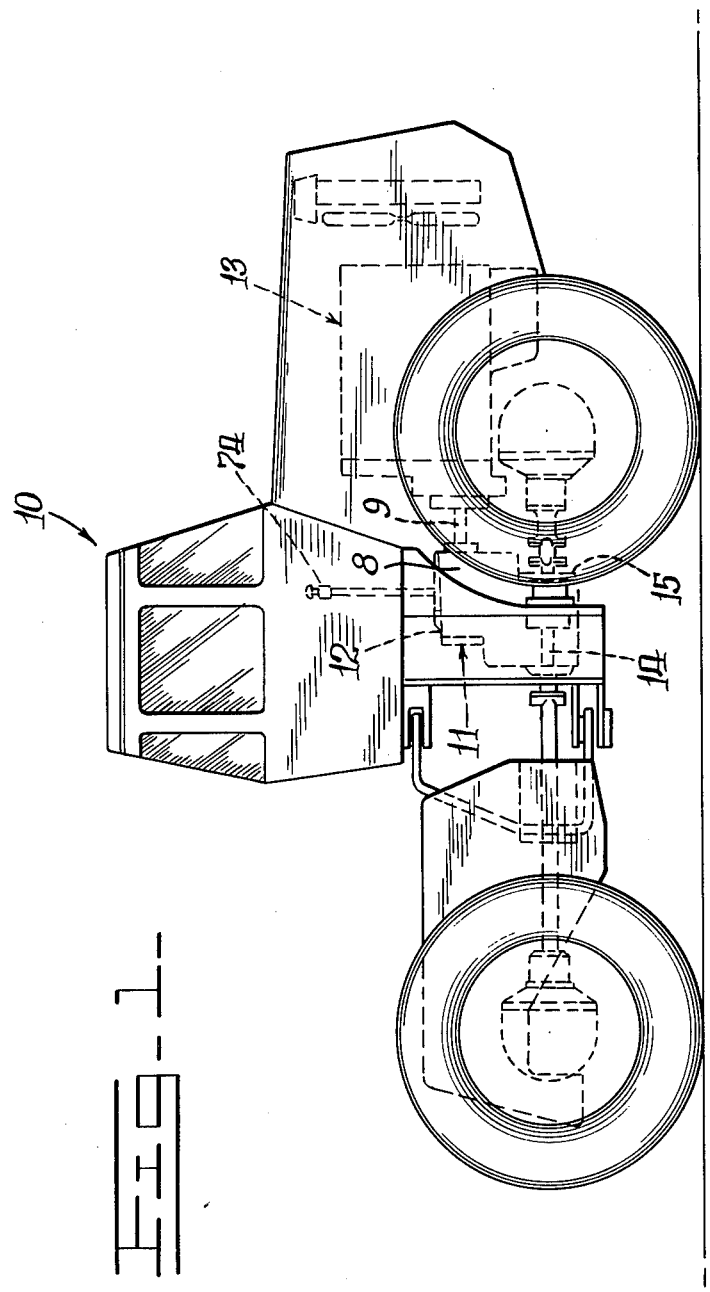
FIG. 1 is a side elevation view of a vehicle having a transmission incorporating a braking system of the type which is the subject of this invention.

Referring to FIG. 1, a wheeled vehicle such as tractor 10 is illustrated having a transmission housing 12 containing a transmission 11 including a reduction section 8 driven by an engine 13 through an input shaft 9. Output torque from transmission 11 is provided from reduction section 8 to output shaft 14 which may drive both the front and rear wheels of tractor 10. Included in transmission housing 12 and associated with output shaft 14 is a service and parking brake assembly 15 best illustrated in FIG. 2.

Service and parking brake assembly 15 is comprised of an annular plate member 16 which surrounds output shaft 14 and is rigidly affixed to transmission housing 12 by fastening means 17, here illustrated as a plurality of bolts. Extending inwardly of transmission housing 12 and integral of annular plate member 16 are two concentric cylindrical projections 18 and 19. Outer cylindrical projection 19 has at the inward end a flange portion 20 to which an annular cylinder head 22 and a brake disc spport cylinder 23 are affixed by a plurality of bolts 25. At the extreme end of brake disc support cylinder 23 is a second annular plate 27 acting as a reaction member for a plurality of brake discs 45 to be described forthwith. Second annular plate 27 is affixed to brake disc support cylinder 23 by a plurality of bolts 28. Annular cylinder head 22 extends radially inwardly of a cylindrical projection 19. Annular plate 27 also extends radially inwardly of brake disc support cylinder 23, both annular cylinder head 22 and annular plate 27 surrounding output shaft 14. Immediately adjacent to and slidably surrounding the exterior of inner cylindrical projection 18 is brake disc cmpression member 29, brake disc compression member 29 being generally cylindrical in shape and having integrally formed therewith an outwardly extending cylindrical flange 31 at the end extreme of cylindrical projection 18.

Interposed between cylindrical projection 19 and brake disc compression member 29 is an annular piston element 33, which serves to engage and disengage the brakes. Annular piston element 33 abuts a stepped flange surface 35 formed by an enlarged diameter of brake disc compression member 29. The opposite end of annular piston element 33 is in contact with a retaining ring 36 positioned in annular groove 37 of brake disc compression member 29. Thus piston element 33 reciprocates as a unit with brake compression member 29 to act as a brake applicator means.

Piston element 33 defines a plurality axial bores in the end proximate retaining ring 36 to form cavities 39 circumferentially spaced about its circumference. Each cavity is formed to receive a helical spring 41 and a cup shaped spring retaining element 43. Helical spring 41 which is disposed between annular plate member 16 and spring retaining element 43 urges brake disc compression member 29 and piston element 33 in a first direction.

A plurality of interleaved braking discs 45 are interposed between cylindrical flange 31 and annular plate 27, with alternate discs being slidably associated with brake disc support cylinder 23 while intervening discs are slidably associated with output shaft 14 and rotatable therewith. Movement of piston element 33 and brake disc compression member 29 in a first direction by the urging of helical spring 41 causes the interleaved braking discs to come together in a braking relation one with another to inhibit rotation of output shaft 14.

Sealing means are provided to form sealed chambers for the introduction of air pressure to overcome the aforedescribed action of helical spring 41 or to augment the action of helical spring 41. A seal 47 is provided at the bearing surface of annular cylinder head 22 and brake disc compression member 29, a second seal 48 is positioned between brake disc compression member 29 and piston element 33 while a third seal 49 is positioned between piston element 33 and cylindrical projection 19. A sealed annular chamber 50 is thus formed between piston element 33, brake disc compression member 29, annular cylinder head 22 and cylindrical projecton 19. Passage means 52 are provided in cylindrical projection 19 to allow air pressure to be introduced into annular chamber 50 to urge piston element 33 and brake disc compression member 29 in a second direction, to the left as illustrated in FIG. 2, thereby allowing the plurality of interleaved braking discs 45 to separate and allow output shaft 14 to rotate freely.

A fourth seal 54 is positioned between cylindrical projection 18 and brake disc compression member 29 thereby forming a second sealed chamber 56 on the opposite side of piston element 33. At least one passage 58 is provided in annular plate member 16 to allow the introduction of air pressure into chamber 56 to augment the force of helical spring 41 for the application of brakes during operation of the vehicle, thus providing a service brake capability. The working surface of chamber 56 is made larger than the working surface of chamber 50 so that introduction of air pressure to chamber 56 will overcome an equal pressure in chamber 50 which is open to the vehicle pressure tank. In the illustrated embodiment, the plurality of helical springs 41 are compressed on installation as hereinafter described with sufficient force to stop the tractor 10 while traveling at a particular speed within a specified distance without the introduction of air pressure in chamber 56, therefore a "fail-safe" provision has been incorporated into the braking system to automatically apply the vehicle service brakes upon failure of the vehicle air pressure system.

A parking brake valve 74 of conventional design is provided to block communication of air pressure to chamber 50 from the vehicle pressure tank while simultaneously venting entrapped air pressure in chamber 50 to the atmosphere thus allowing helical springs 41 to urge brake disc compression member in the first direction to apply the brakes.

Cooling of the plurality of interleaved braking discs 45, which is necessary for proper and safe operation, may be provided by the lubricating fluid of the transmission through an axial bore 59 defined in output shaft 14. Fluid may be introduced into axial bore 59 through means well-known in the art and such means are not further discussed. Radial ports 61 are located in output shaft 14 generally adjacent to annular chamber 50. Thus, fluid under pressure introduced into axial bore 59 is communicated to the vicinity of the plurality of interleaved braking discs 45 to provide both cooling and lubrication of the parts therein. Such fluid may be recirculated to the transmission by a conventional sump and pump arrangement (not shown).

Moving the vehicle without providing air pressure to the vehicle air pressure system and thus to chamber 50, may be accomplished by mechanically moving brake compression member 29 and piston element 33 in the second direction. Mechanical means to release the service brakes are thus provided in the form of at least two elongated threaded members 63 which engage piston element 33 and extend through annular plate member 16. Threaded member 63 is illustrated in FIG. 2 in the "towing position," that is fully threaded into piston element 33 thereby acting against the force of the plurality of helical springs 41 to draw piston element 33 in the second direction and separate the plurality of interleaved braking discs 45. By backing out elongated threaded members 63, piston element 33 is free to act under the urging of helical springs 41 to compress the braking discs 45. To maintain the integrity of chamber 56, a cover 65 is affixed to annular plate member 16 by suitable fastening means such as bolts 67 with a seal member 69 interposed between cover 65 and annular plate member 16.

During assembly it is necessary to compress helical spring 41 sufficiently to allow the mating of the various elements of the service and parking brake assembly 15 and to establish sufficient compressive force in helical spring 41 to provide for the aforesaid "fail-safe" application of brakes. Accordingly, a plurality of studs 71 equal to the number of helical springs 41 are provided to precompress helical springs 41. Studs 71 also serve a useful purpose in disassembly of the service and parking brake assembly to prevent hazardous projection of the various elements when bolts 25 are removed. Each stud 71 has an enlarged head disposed in cup-shaped retaining element 43 and a shank having a threaded end 75 extending through an aperture 70 in the bottom of retaining element 43. Threaded end 75 is disposed in a threaded aperture 76 in annular plate 16 so that cup-shaped retaining element 43 retains helical spring 41 in a partially compressed state. It should be pointed out that annular piston 33 and brake disc compression member 29 are depicted in a brake release position in FIG. 2, that is moved fully to the left in a second direction.

Service and parking brake assembly 15 in the embodiment illustrated also serves as a bearing surface for a roller bearing 72 or some other suitable bearing for output shaft 14. Suitable seals may be provided between service and parking brake assembly 15 and transmission housing 12 and output shaft 14 to insure integrity of the lubrication system of the associated transmission. Such seals are well within the capability of the art and are not herein further described.

In operation the brake disclosed herein is normally in the applied position due to the urging of the plurality of helical springs 41. Upon application of air pressure to passage means 52, piston element 33 and brake disc compression member 29 are urged in a second direction to the position shown in FIG. 2 to separate the interleaved braking discs 45 and allow output shaft 14 to freely rotate. Application of the service brakes is accomplished by applying air pressure to passage 58 to augment the force of helical spring 41. It is emphasized that the working surface of chamber 56 is larger than the working surface of chamber 50 thereby the air pressure acting in chamber 56 overcomes the air pressure acting in chamber 50 with air in chamber 50 being communicated directly to the vehicle pneumatic service tank (not shown). Failure of vehicle air pressure with a resulting loss of pressure in the vehicle service tank results in a similar loss of pressure in chamber 50 and allows helical springs 41 to urge piston member 33 and brake disc compression member 29 in the first direction causing the interleaved braking discs to come together in a braking relation and inhibit rotation of output shaft 14. In view of the relative working sizes of chamber 56 and chamber 50 a partial loss of vehicle air pressure still permits operation of the vehicle service brakes as long as sufficient pressure remains to overcome the urging of helical springs 41. In order to move the vehicle with no air pressure available to apply to chamber 50, the elongated threaded members 63 are tightened thus moving piston element 33 in the second direction to release interleaved braking discs 45.

Although this embodiment has been described and illustrated in the specification and accompanying drawings with respect to a specific embodiment, modifications and changes may be made therein without departing from the true spirit and scope of the invention.

What is claimed is:

1. In combination with a vehicle transmission having an input member rotatably driving a reduction section, an output shaft rotatably driven by the reduction section, and a transmission housing substantially encompassing the transmission, a vehicle brake assembly disposed in said housing and comprising:
   a brake disc support cylinder rigidly associated at one end thereof with said transmission housing and surrounding said output shaft;
   a plurality of interleaved braking discs disposed in said support cylinder and arranged so that one disc is slidably associated with said output shaft and the next adjacent disc is slidably associated with said brake disc support cylinder;
   a first annular plate member affixed to the other opposite end of said brake disc support cylinder to retain said plurality of brake discs in the aforesaid relation;
   a second annular plate member rigidly affixed to said transmission housing surrounding said output shaft and having integrally formed therewith inner and outer concentric cylindrical projections coaxially surrounding said output shaft and extending inwardly of the transmission housing, said brake disc support cylinder rigidly affixed at the inner end of the outer concentric cylindrical projection and extending therefrom inwardly of said transmission housing;
   brake applicator means interposed between said housing and said plurality of interleaved braking discs and movable in a first direction for urging said interleaved braking discs toward said first annular plate member to allow said interleaved braking discs to come together in braking relation one with another to inhibit rotation of said output shaft and movable in a second direction to allow said interleaved discs to separate whereby said output shaft may freely rotate;
   said brake applicator means comprising a brake disc compression member having a cylindrical shape and slidably disposed around the exterior of the inner concentric cylindrical projection, said brake disc compression member having an outwardly extending flange integrally formed at the end adjacent to said plurality of interleaved discs, and an annular piston element surrounding and rigidly associated with said brake disc compression member and disposed between said brake disc compression member and said outer cylindrical projection to form a sealed annular spring chamber with said second annular plate member;
   resilient means disposed in said annular sealed spring chamber between said annular plate member and said piston element said resilient means for urging said annular piston element and said brake disc compression member in said first direction;
   release means operable for urging said brake applicator means in said second direction; and
   actuator means selectively operable to act in cooperation with said resilient means for overcoming said release means to urge said brake applicator means in said first direction.

2. The combination set forth in claim 1 further comprising a source of air pressure and an annular cylinder head rigidly affixed to the inner end of the outer cylindrical projection of the second annular plate member and extending radially inwardly therefrom to sealingly engage the brake disc compression member, said annular cylinder head forming a brake release chamber with said brake disc compression member, said outer cylindrical projection and said annular piston element;

and wherein said outer cylindrical projection defines first passage means communicating with said brake release chamber;

said release means comprising air pressure communicated to said brake release chamber through said first passage means for urging the brake applicator means in the second direction.

3. The combination set forth in claim 2 wherein said second annular plate defines second passage means communicating with the annular spring chamber and further wherein the actuator means comprises air pressure communicated to said annular spring chamber through said second passage means for urging the brake applicator means in the first direction.

4. The combination set forth in claim 3 wherein the annular piston element defines a first working surface exposed to said annular spring chamber and a second working surface exposed to said release chamber, said first working surface having a relatively larger surface area than said second surface whereby air pressure communicated to said spring chamber will overcome a substantially equal air pressure communicated to said release chamber thereby urging said brake applicator means in the first direction.

5. The combination set forth in claim 4 further comprising valve means for selectively blocking air pressure communicated to said release chamber while simultaneously venting said release chamber to atmospheric air.

6. The combination set forth in claim 5 wherein said annular piston element defines a plurality of axially aligned cavities opening to the first working surface;

and further wherein the brake assembly comprises a plurality of spring retention elements each formed to fit in one of said axially aligned cavities;

and wherein the resilient means comprises a plurality of helical springs, each said helical spring engaging the second annual plate at one end and disposed in an axially aligned cavity to engage a spring retention element at the other end.

7. The combination set forth in claim 6 further comprising a plurality of threaded studs each stud threadably engaging the second annular plate at one end and rotatingly associated with a spring retention element at the other end so that rotation of said threaded stud in one direction compresses the helical spring disposed between said spring retention element and said second annular plate.

8. The combination set forth in claim 7 wherein the transmission includes means for providing fluid under pressure to said transmission for lubricating and cooling the transmission elements and a predetermined amount of lubrication and cooling fluid;

and further wherein said output shaft of said transmission defines fluid passage means for communicating said lubricating and cooling fluid to the plurality of interleaved braking discs for cooling said interleaved braking discs.

9. The combination set forth in claim 8 wherein said brake assembly further comprises mechanical release means mechanically operable to urge the brake actuator means in the second direction.

10. The combination set forth in claim 9 wherein the mechanical release means comprises:

at least two elongated threaded members extending through the second annular plate and threadably engaging the annular piston element;

a plurality of covers affixed to said annular plate member and each substantially covering the end of an elongated threaded member extending therethrough; and a plurality of seals to sealingly close the juncture of said covers and said second annular plate member, whereby rotation of said elongated threaded member in one direction urges said brake applicator means in the second direction, and rotation of said elongated threaded member in the other opposite direction allows the resilient means to urge said brake applicator means in the first direction.

* * * * *